United States Patent [19]

Weinberger

[11] Patent Number: 5,543,631
[45] Date of Patent: Aug. 6, 1996

[54] HYBRID ORGANIC-INORGANIC BISTABLE NONLINEAR OPTICAL GATE

[76] Inventor: Lester Weinberger, 5225 Pooks Hill Rd., Apt. 1327-S, Bethesda, Md. 20814

[21] Appl. No.: 219,768

[22] Filed: Mar. 29, 1994

Related U.S. Application Data

[63] Continuation-in-part of Ser. No. 78,057, Jun. 17, 1993, Pat. No. 5,376,784.

[51] Int. Cl.$^6$ ............ H01L 35/24; H01L 51/100
[52] U.S. Cl. ............ 257/40; 257/21; 257/184; 250/214 LS
[58] Field of Search ............ 257/14, 21, 22, 257/23, 40, 184; 250/214 LS; 377/102; 359/248, 257

[56] References Cited

U.S. PATENT DOCUMENTS

| | | | |
|---|---|---|---|
| 3,447,922 | 6/1969 | Weinberger | 204/181 |
| 3,448,028 | 6/1969 | Weinberger | 204/181 |
| 3,448,029 | 6/1969 | Weinberger | 204/181 |
| 3,448,030 | 6/1969 | Weinberger et al. | |
| 4,546,244 | 10/1985 | Miller | 250/211 J |
| 4,754,132 | 6/1983 | Hinton et al. | 250/211 J |
| 4,877,952 | 10/1989 | Halemane | 250/214 LS |
| 5,093,565 | 3/1992 | Lentine | 250/213 A |
| 5,288,990 | 2/1994 | Miller | 250/214 LS |
| 5,315,129 | 5/1994 | Forrest et al. | 257/21 |
| 5,416,338 | 5/1995 | Suzuki et al. | 257/21 |

OTHER PUBLICATIONS

Electronic Engineering Times, Oct. 5, 1992 (page 35) "Dual wavelength SEED simplifies Optical designs".

So et al. "Organic–on–Organic Photodetector" IEEE Trans. on Electron Dev., vol. 36, No. 1 Jan. 1989, pp. 66–69.

So et al. "Evidence for Exciton Confinement in Crystalline Organic Multiple Quantum Wells" Physical Review of Letters vol. 66 No. 20, May 1991 pp. 2649–2652.

Weinberger et al. "Preparation and Characterization of 8,13–Dioxodinadtho[2,1–b:2', 3'–d] furan–6–carboxanides".

Journal of Heterocyclic Chemistry vol. 6, No. 5, 1969, pp. 761–764.

Optical Computing by D. Feitelson MIT Press, Cambridge Press.

*Primary Examiner*—Sara W. Crane
*Attorney, Agent, or Firm*—William D. Hall

[57] ABSTRACT

This invention describes a dual mode optical switching device comprising organic quantum well regions interfacing with inorganic semiconductors. Each mode generates excitons and a photocurrent in their respective quantum well regions in response to incident control beams of different wavelengths of light. The photocurrents in each mode independently modulate the transmission of the lower frequency signal beams. Multiple hybrid organic/inorganic quantum well optical devices can be crafted into optical logic gates by using light impulses in a manner that is analogous to the way electronic gates are used in electronic systems. These devices can also perform as optical switches and optical interconnects between electronic elements. Thus the processing units are electronic and the connections between them are optical, comprising optoelectronic system with higher data throughput that will exceed electronic systems. Arrays of hybrid organic/inorganic quantum well optical devices create the opportunity for parallel processing.

12 Claims, 3 Drawing Sheets

R = 2-PYRIDYL

= 2-PYRIMIDINYL

= 2-THIAZOLYL

= 3-(H-1,2,4-TRIAZOLYL)

= — PHENYL

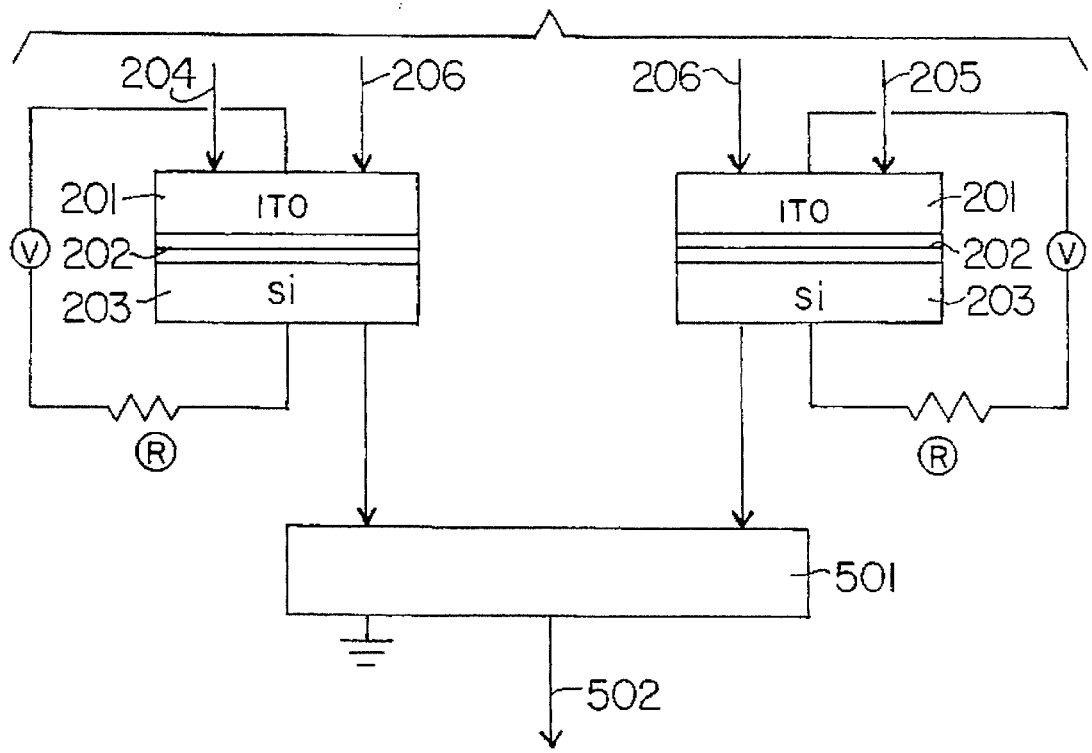

HYBRID ORGANIC-INORGANIC BISTABLE NONLINEAR OPTICAL GATE

RELATED APPLICATION

This application is a continuation-in-part of my prior application Ser. No. 08/078,057 filed Jun. 17, 1993 and entitled Hybrid Organic-Inorganic Bistable Nonlinear Optical Device, now U.S. Pat. No. 5,376,784.

TECHNICAL FIELD

This invention describes a hybrid nonlinear organic-inorganic device for optical switching.

BACKGROUND OF THE INVENTION

Self Electrooptic Effect Devices (SEEDs) using InGaAs/AlGaAs multiple quantum wells as optical switching devices have been developed by AT&T. U.S. Pat. No. 4,546,244 issued to D. A. B. Miller, describes these devices which are fundamental for AT&T's bid for an optoelectronic computer. These optically nonlinear devices must operate sequentially to produce the bistable switching demands for Boolean Logic operations.

In Phys. Rev. Lett., vol. 66, No. 20 (1991), F. F. So and S. R. Forrest describe the preparation and quantum mechanics of an organic multiple quantum well region.

SUMMARY OF THE INVENTION

This invention is a dual wave hybrid organic-inorganic optical switching device. Low switching energy is accomplished by the use of organic quantum wells generating excitons and creating a photocurrent by the absorption of light at one wavelength which causes a change in optical absorption of a second wavelength of different frequency.

The materials which comprise organic quantum wells are much easier to purify than the ones comprising the inorganic quantum wells. Organic materials form thin films with greater facility than the inorganic materials when deposited under the necessary vacuum conditions. These factors greatly reduce manufacturing costs and failure rates. Organic quantum wells are less sensitive to thermal and mechanical shock than inorganic ones. Organic quantum wells have faster response times than inorganic ones.

The vast number of organic materials containing pi orbitals create the opportunity to select control beams from a broad range of wavelengths including the high energy, high frequency ultraviolet wavelengths. This permits individual unit devices of an array to act independently and perform fast parallel processing. This is in contrast to the AT&T SEED devices which operate in series to produce the bistable switching necessary to perform Boolean logic.

Hybrid organic-inorganic bistable nonlinear optical gates can be fabricated into device arrays with data throughput that exceeds electronic systems. Electronic devices have been reaching the optimum wire saturation density per unit area and volume per chip. Optical beams, in contrast to electrical wires, can pass through or near one another without the penalties associated with the total electrical systems such as short circuits and magnetic interference. Optical devices are not subject to ohmic resistance and the consequent problems of heat generation. Heat seriously impairs the function of electronic circuitry causing system failures. This often necessitates the additional burden of using refrigeration. Optical circuits avoids these problems.

BRIEF DESCRIPTION OF THE DRAWINGS

FIG. 5 illustrates the organic-inorganic optical gate.

FIG. 6 is a truth table.

DETAILED DESCRIPTION

Quantum wells, made in accordance with the prior art, are made with great difficulty and expense from multiple layers of the group III–V gallium and arsenic inorganic semiconductor elements. The stringent requirement of lattice matching by deposition of multiple layers of semiconductor material is a serious barrier to the necessary confinement of excitons, the excited electron-hole pairs.

Inorganic molecules and crystals, in the prior art, are held together by electrovalent or ionic bonds. Organic molecules are held together by the sharing of atomic orbitals between atoms. Weak electrostatic attractions termed Van der Waals forces, bond organic molecules to form crystals. This can allow strain relaxation between alternate layers of the crystals derived from select organic molecules.

Conversely, each of the Hybrid Organic-Inorganic Bistatic Optical Devices (HOBODs) contain its own wavelength control pulses which eliminate optical crosstalk and concurrently allow independent operation of each member of an array.

Another advantage of the HOBODs is that a wide range of wavelengths can be used for the control pulse. Furthermore, the vast number of organic compounds and polymers containing conjugated pi molecular orbital systems can be matched to a particular wavelength for the control pulse.

Organic molecules and polymers are much easier to fabricate than inorganic materials. This mitigates many of the severe constraints which are current in the manufacture of inorganic semiconductor materials.

Figure 1:
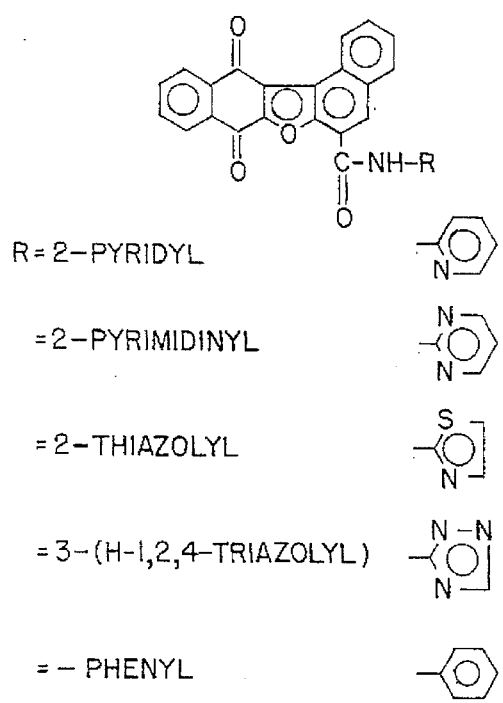
FIG. 1 shows the chemical structures of the organic materials used for the quantum wells.

FIG. 1 shows the structure of N-2"pyridyl 8,13-dioxodinaphtho[2,1-b:2',3'-d]furan-6-carboxamide, R=2-pyridyl. This material absorbs blue light and becomes highly photoconductive. Substituting a halogen atom for one the the hydrogens in the pyridyl ring also sustains high conductivity.

Replacing the nitrogen atom in the pyridyl ring with a carbon atom creates the phenyl group, R=phenyl, This results in a drastic reduction of photoconductivity. Photoconductivity is restored if a halogen atom, i.e. bromine, or alkoxy groups replaced a hydrogen atom in the phenyl group.

Single crystals have been obtained only for the pyridyl compound. Table 1 show the unit cell dimensions as the result of X-ray diffraction studies. The unit cell volume is 1901 Å. The number of molecules in the unit cell is 4. The density is 1.46 g/cm. There is no evidence of polymorphism. Infrared measurements (table 2) show no indication of dimerization or hydrogen bonding; thus none of the molecules in the unit cell are bound by any forces stronger than Van der Waals.

TABLE 1 unit cell dimensions

| | | |
|---|---|---|
| a = 19.95 + .01Å | b = 14.28 + .02Å | c = 7.47 + .008Å |
| α = 113.80 + .05° | β = 102.66 + .05° | Y = 85.28 + .05° |

TABLE 2

| R | Infrared Spectra cm$^{-1}$ | |
|---|---|---|
| | NH Stretch | C = 0 Stretch |
| 2-Pyridyl | 3406 Sharp | 1667.0 |
| | | 1675.5 |
| 2-Pyrimidinyl | 3415 Sharp | 1675: 1700 shoulder 1705 |
| 2-Thiazolyl | 3398 Sharp | 1670 shoulder 1675 |
| 3-(1H 1,2,4-Triazolyl) | 3240 Broad | 1675 Broad |

Figure 2:
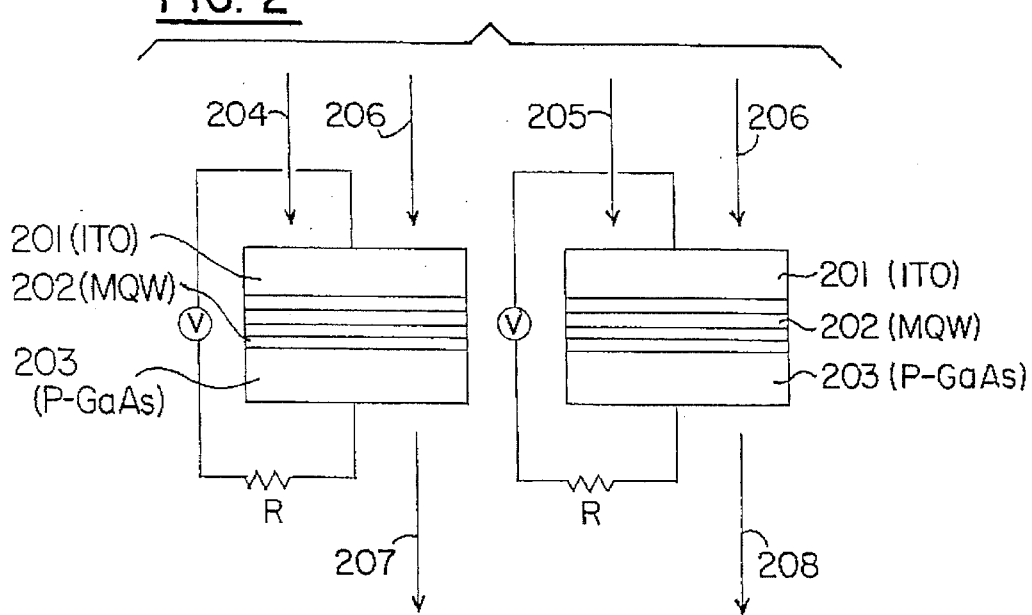
FIG. 2 is a cross-sectional diagram of the dual mode device showing the optoelectronic circuit.

FIG. 2 shows the embodiment of the invention. Both devices A and B are identical but use different photonic energies for their control beams. Indium tin oxide (ITO) 201, is the transparent conducting electrode. Alternate layers of dyes or pigments, for example the pyridyl and phenyl carboxamides 202 as described in FIG. 1, comprise the multiple quantum wells (MQWs). p-GaAs 203, is the inorganic semiconductor. Other semiconductors on which organic materials have been grown are Si and InP. Both devices have identical voltage and resistor sources.

Voltage from source V is applied across the photodiode perpendicular to the plane of the quantum well structures creating a photocurrent from the electron-hole pairs. The resistor R acts as an electrical load and the voltage across the photodiode drops causing an increase in optical absorption thus generating more carriers and increasing the photocurrent. This is the positive feedback.

In the A device a high energy photonic beam 204, of blue light of 457 nm, is readily absorbed by the alternating layers of the yellow carboxamides, creating the energetic electron-hole pairs of excitons. This is the control beam 204 and it is not transmitted by the AsAs. The near infrared 850 nm. signal beam's transmission through the device is controlled by the absorption of this input beam 204. The collateral device, B, uses a blue-green 528 nm input control beam 205.

When the light intensity of the control beam 204 is high, there is a decrease in the electric field and the quantum well strongly absorbs the signal beam 206 and the transmitted light from this beam sharply decreases. This constitutes the switching from the transmitting state to the blocking state. When the control beam intensity input is lowered the switchback occurs. This constitutes the bistatic function of the device. Low intensity of the input beam increases transmission of the signal beam; high input reduces transmission.

Figure 3:
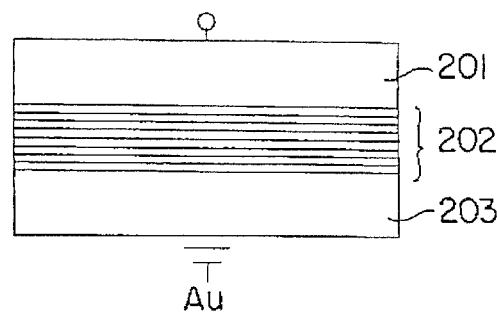
FIG. 3 is a cross-sectional diagram showing the multiple quantum well layers.

FIG. 3 is a side view showing layering of the materials for the device. The alternating layers of the pyridyl and phenyl carboxamides consisting of equal thickness are grown by the ultra-high vacuum techniques, similar to those used for epitaxial growth of inorganic structures. The film thickness for each layers is 12 Å, and a total of 24 periods are deposited. Film growth is monitored by an oscillating quartz-crystal system (Leybold-Heraeus Inficon IC6000). The 4,000 Å of transparent indium-tin-oxide 201, is formed by sputtering a mixture of $In_2O_3$ and SnO at room temperature at $10^{-3}$ torr in an argon atmosphere onto the top organic film surface. A resistor and a power source, creating a $5 \times 10^3$ v/cm. field, is used for each device. Laser power sources range from 20 to 100 µW.

The resistors in FIG. 2 may be replaced by a PN junction photodiode. An independent light source directed at the photodiode would generate additional photocurrent. A PNP phototransmitter is more advantageous because the photocurrent generated by its light absorption is amplified making the device more sensitive to the control beams, 204 and 205. A photoconductor may also be used as an adjunct photocurrent generator.

The binary device described in FIG. 2 can be configured into a two dimensional array. The device can also function as a spatial light modulator.

Figure 4:
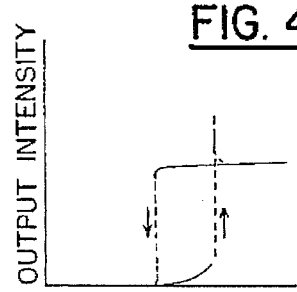
FIG. 4 graphically represents a characteristic curve for an optically bistable system.

Each module, A and B of the dual control beam device, FIG. 2, exhibits optical bistability. There are two stable output intensity levels, low and high transmittance, for a given input intensity. FIG. 4 demonstrates the classic curve for either bistable device, A or B in FIG. 2. The combinations of low and high transmittances can be read to create AND; OR logic gates. In FIG. 2, a low intensity output beam, 207, in device A in contrast to a high intensity beam 208 in device B signifies a binary 1. Conversely, a high intensity beam, 207, in device A and a low intensity beam 208 in device B signifies a 0.

If modules A and B have different quantum well compositions then identical control and signal beams may be used to create the AND/OR logic gates.

An effective waveguide may be achieved by directing a beam of near infrared frequency parallel to the plane of the quantum wells. However, layer thicknesses have to be altered to match mode resonances for optimum light propagation.

FIG. 5 illustrates a cross section of the optical gate with the two signal beams, 207 and 208 impinging upon the photodiode, 501, which may be a charge coupled device known as a CCD. These devices change radiant energy into electrical signals. These signals can be altered, i.e. amplified and routed to other areas of the computer system, via conventional metallic conduits, 502. Dependent on the ratio of their intensities, the two output signal beams yield Boolean logic values of 1s and 0s. All four Boolean functions consisting of AND, OR, NOR, NAND can be accomplished by varying the ratio of the output of the two signal beams.

The optical devices in FIGS. 2 and 5 can be set or reset into two stable states by varying the intensities of the input beams, 204 and 205. Acoustooptic modulators, commercially available, can control the intensities and clock the input pulses of the control beams.

The optical devices in FIGS. 2 and 5 can function as a SET-RESET latch by varying the intensities of the input control beams, 204 and 205. One ratio of input control beams, 204 and 205 sets the ratio of the output signal beams, 207 and 208. This sets the device to a logic 1. Changing the input ratio resets the device to a logic 0. The device retains its initial state until the other input reverses it.

The device operates as a set-reset latch when both control beams 204 and 205 are removed and transmission of the signal beams 207 and 208 is highest. This constitutes the logic 1 state. This state remains static until the device is reset by the re-introduction of the control beams and the corresponding reduction of the transmission of the signal beams. This is the logic 0 state. The rates of removal or re-introduction of the control beams clocks the timing of the device between the set and reset states. The device can be set and re-set by retaining the control beam in one photodiode of the device and removing or modulating the intensity of the other control beam of the other photodiode. The input signal beams remain constant for both photodiodes.

FIG. 6 shows the TRUTH TABLE for the device's Boolean functions. In this truth table, presets A and B are control beams 204, 205 that are the inputs to the optical switches A and B. Q and $\overline{Q}$ are the outputs 207 and 208 respectively. They are inverse values, i.e. if Q=1, then $\overline{Q}$=0.

Figure 7:
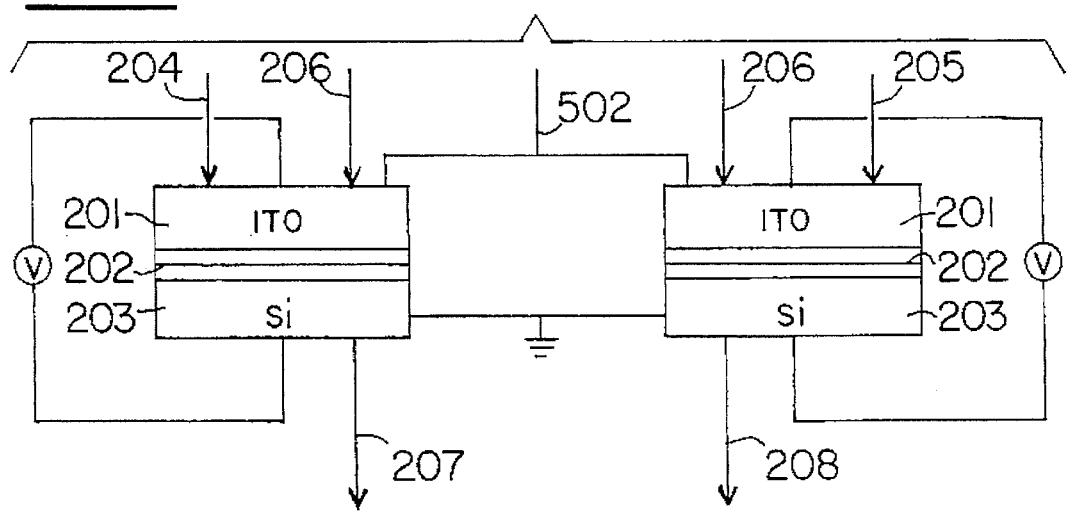
FIG. 7 illustrates a dual mode optical cascade junction.

FIG. 7 shows an optoelectronic cascade junction comprising the electric input 502 from a dual mode optical device as depicted in FIG. 5. Both dual mode devices consist of identical organic quantum wells 202 superimposed on inorganic semiconductors, control beams 204 and 205 and input signal beams 206.

Alternate optoelectronic cascade junctions can be fabricated by altering the material composition of the organic quantum wells 202, inorganic semiconductors and the wavelengths of the control beams 204 and 205 and the signal beam 206.

The electrical input 502, modifies the electric field in the FIG. 7 optical device by altering the magnitude of the dipoles formed between the electrons and protons of the atoms comprising the organic quantum wells 202. The change in the dipoles modifies the refractive index of the organic quantum wells creating large differences in their optical transmittance.

Small changes in the applied electric fields of the organic quantum wells create large differences in their optical transmittances. This constitutes a significant advantage over inorganic quantum wells.

Figure 8:
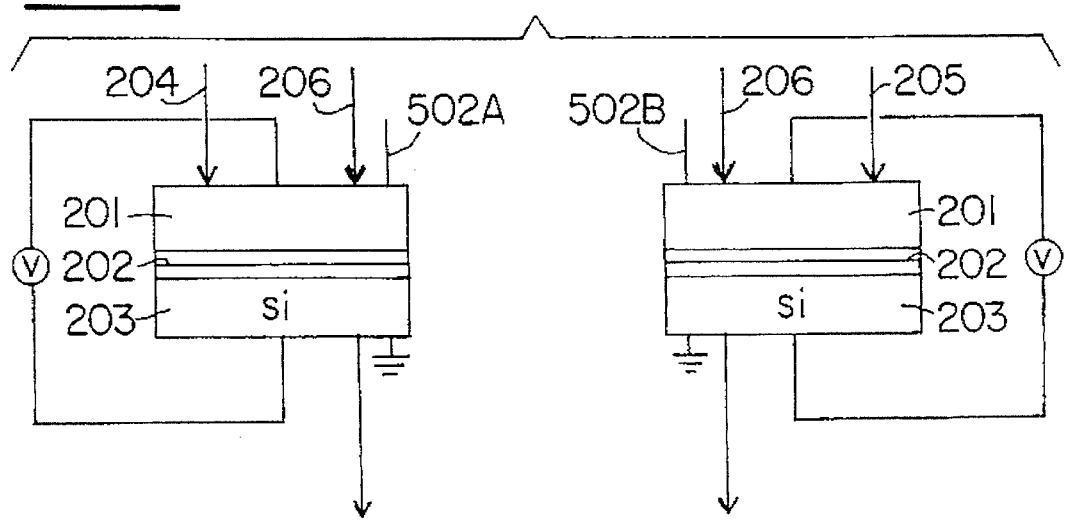
FIG. 8 illustrates an alternate dual mode cascade junction.

FIG. 8 shows an alternate architecture whereupon two dual mode optical devices as described in FIG. 5, independently feed electrical information 502, into each of the modes of a second optical device as described in FIG. 2. The output of one of these dual mode optical devices bears number 502A and the output of the other one of these dual mode optical devices bears number 502B. The second optical device acts as a load for the first device and there is no need for a resistor in the second or subsequent devices.

Both systems transfer electrical information from one optical device to another optical device which is receiving the information. There is no limit to the number of devices which can be connected in tandem.

Cascading is an important function in computer architecture. It allows for the transfer of information to different locations in a computer for the purpose of parallel processing. Parallel processing consists of breaking up a computation into smaller segments and computing each segment at the same time. This contrasts with serial computing, whereupon each operation must await the completion of the previous one.

Cascading plus the large transmittance gains that are achieved with organic quantum wells create a unique opportunity for fast processing of data.

The word "light" as used herein includes visible, ultraviolet and infra-red electromagnetic radiation. The words "signal light" refers to the light that is controlled by a switch, for example light 206.

I claim to have invented:
1. In a system that produces data:
   at least two optical switches, and
   control means for controlling said switches to produce an output that comprises data,
   each of said switches having an inorganic semiconductor and an organic quantum well interfacing said inorganic semiconductor,
   means for illuminating each switch with signal light,
   said control means including, for each switch, means for illuminating the switch with light and for controlling the passage, through the switch, of said signal light that is directed at the switch,
   said organic quantum well including a layer that comprises material as shown below:

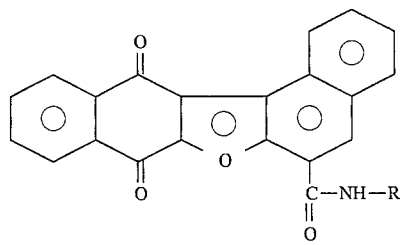

where R=a pyridyl ring containing one or more electrons withdrawing atoms or groups.
2. In a system that produces data:
   at least two optical switches, and
   control means for controlling said switches to produce an output that comprises data,
   each of said switches having an inorganic semiconductor and an organic quantum well interfacing said inorganic semiconductor,
   means for illuminating each switch with signal light,
   said control means including, for each switch, means for illuminating the switch with light and for controlling the passage, through the switch, of said signal light that is received by the switch,
   said organic quantum well including a layer that comprises material as shown below:

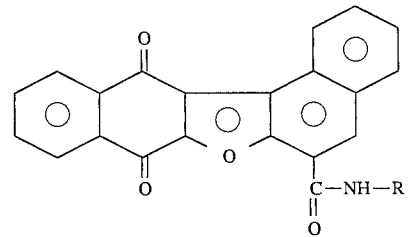

where R=a pyridyl ring containing one or more electrons donating atoms or groups.
3. In a system that produces data:
   at least two optical switches,
   control means for changing the amount of signal light passing through said switches to produce data,
   each of said switches having an inorganic semiconductor and a quantum well interfacing said inorganic semiconductor, said quantum well comprising dye or pigment material,
   means for illuminating each switch with light,
   said control means including, for each switch, means for illuminating said material with light and for changing the amount of the signal light that passes through the switch.
4. In a system for producing data,
   means including at least first and second optical switches for producing data,
   each switch comprising means responsive to light of one frequency for changing the transparency of the switch to light of a substantially different frequency, each said switch comprising an inorganic semiconductor and an organic quantum well interfacing said inorganic semiconductor; said organic quantum well comprising means for changing the transparency of the switch to light of said different frequency in response to light of said one frequency, a control means for each switch for applying light of said one frequency to its complementary switch, and means for producing signal light of said different frequency and applying it to each of said switches, said quantum well comprising a dye or pigment which permits the quantum well to absorb the light applied to the switch by said control means, said quantum well comprising means for changing the transparency of the switch to said signal light when light applied to said quantum well by said control means is absorbed by the quantum well.

5. In a system for producing data, means including at least first and second optical switches for producing data, each switch comprising means responsive to light of one frequency for changing the transparency of the switch to light of a substantially different frequency, each said switch comprising an inorganic semiconductor and an organic quantum well interfacing said inorganic semiconductor; said organic quantum well comprising means for changing the transparency of the switch to light of said different frequency in response to light of said one frequency, said organic quantum well comprising material as shown below:

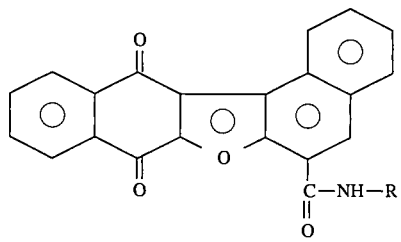

where R=a pyridyl ring containing one or more electrons withdrawing atoms or groups.

6. In a system for producing data, means including at least first and second optical switches for producing data, each switch comprising means responsive to light of one frequency for changing the transparency of the switch to light of a substantially different frequency, each said switch comprising an inorganic semiconductor and an organic quantum well interfacing said inorganic semiconductor; said organic quantum well comprising means for changing the transparency of the switch to light of said different frequency in response to light of said one frequency, said organic quantum well comprising material as shown below:

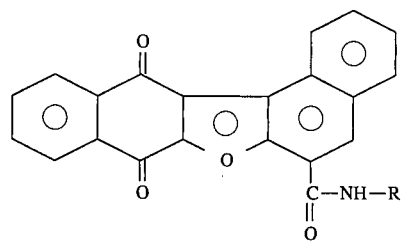

where R=a pyridyl ring containing one or more electrons donating atoms or groups.

7. A system for producing data as defined in claim 4, in which said switches comprise at least a part of a circuit component.

8. A system for producing data as defined in claim 4, comprising another switch having an inorganic semiconductor and, an organic quantum well interfacing said inorganic semiconductor, and means for producing a voltage that varies as said transparency changes and for applying said voltage to and thereby modifying the functioning of said another switch.

9. A method of producing data, comprising:

providing at least two optical switches each of which is responsive to a control light for changing the transparency of the switch to a signal light, applying rays, of signal light, to each switch, applying control light rays to said switches to thus control the signal rays and produce data, and providing each switch with a dye or pigment that enhances the responsiveness of the switch to the control light rays applied thereto.

10. The method of claim 9, wherein the step of providing at least two optical switches comprises providing switches that are responsive to visible light for changing the transparency of the switches to near infra red light.

11. In a system for producing data, means including at least first and second optical switches for producing data, each switch having at least one face and comprising means including an organic quantum well, for changing the transparency of the switch to a signal light when a control light is applied to the switch, each switch having control means for applying the control light to the switch and signal means for producing said signal light and applying it to the switch, with the light from both the control means and the signal means being applied to the same face of the switch, each switch comprising a transparent conducting electrode, an organic quantum well and an inorganic semiconductor, said transparent conducting electrode having two faces one of which is the said one face of the switch and the other of which interfaces with said organic quantum well, said quantum well interfacing said inorganic semiconductor.

12. In a system for producing data as defined in claim 11 in which said organic quantum well has a dye or pigment that will absorb at least some of the light applied to said switch by said control means.

* * * * *

UNITED STATES PATENT AND TRADEMARK OFFICE
CERTIFICATE OF CORRECTION

PATENT NO. : 5,543,631

DATED : August 6, 1996

INVENTOR(S) : Lester Weinberger

It is certified that error appears in the above-identified patent and that said Letters Patent is hereby corrected as shown below:

On the title page, item [75],
Change the address of the inventor to read as follows:
1190 Frost Valley Way
Potomac, Md. 20854

Column 3, line 42, change "AsAs" to: -- GaAs --.

Column 5, line 38, change "acts" to: -- may act --.

Signed and Sealed this

Third Day of December, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,543,631
DATED : August 6, 1996
INVENTOR(S) : Lester Weinberger It is certified that error appears in the above-identified patent and that said Letters Patent is hereby corrected as shown below:

On the title page, item [75],
Change the address of the inventor to read as follows:
11920 Frost Valley Way
Potomac, Md. 20854

Column 3, line 42, change "AsAs" to: -- GaAs --.

Column 5, line 38, change "acts" to: -- may act --.

This certificate supersedes Certificate of Correction issued December 3, 1996.

Signed and Sealed this

Second Day of September, 1997

*Attest:*

BRUCE LEHMAN

*Attesting Officer*     *Commissioner of Patents and Trademarks*